United States Patent [19]

Staendeke et al.

[11] 4,136,154
[45] Jan. 23, 1979

[54] STABILIZED RED PHOSPHORUS AND PROCESS FOR MAKING IT

[75] Inventors: Horst Staendeke; Franz-Josef Dany; Joachim Kandler; Werner Klose, all of Erftstadt, Fed. Rep. of Germany

[73] Assignee: Hoechst Aktiengesellschaft, Frankfurt am Main, Fed. Rep. of Germany

[21] Appl. No.: 841,833

[22] Filed: Oct. 13, 1977

[30] Foreign Application Priority Data

Oct. 19, 1976 [DE] Fed. Rep. of Germany ....... 2647093

[51] Int. Cl.$^2$ ................................................ C01B 5/22
[52] U.S. Cl. ............................ 423/265; 260/502.4 R; 423/322
[58] Field of Search ........................ 423/322, 265, 274; 427/220; 260/502.4 R

[56] References Cited

U.S. PATENT DOCUMENTS

| 1,880,535 | 10/1932 | Waggaman | 423/274 |
| 2,559,685 | 4/1949 | Imyokern | 423/322 |

Primary Examiner—Sam Silverberg
Attorney, Agent, or Firm—Connolly and Hutz

[57] ABSTRACT

Production of stabilized pulverulent red phosphorus. The phosphorus so stabilized comprises a homogeneous blend of red phosphorus particles with a size of at most about 2 mm and a metal compound of the second or third group of the Periodic System as an oxidation stabilizer, wherein the metal compound is the aluminum, calcium or zinc salt of a phosphinic acid of the general formula

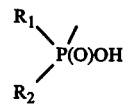

in which $R_1$ and $R_2$ each stand for an alkyl, cycloalkyl, aryl or aralkyl group having 1 to 20 carbon atoms, the metal compound being present in the homogeneous blend in a proportion of about 0.5 to 5 weight %.

16 Claims, No Drawings

STABILIZED RED PHOSPHORUS AND PROCESS FOR MAKING IT

The present invention relates to stabilized red phosphorus and to a process for making it, wherein red phosphorus, which is in the form of an aqueous suspension, is treated with a metal salt of a phosphinic acid of the general formula

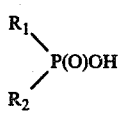

in which $R_1$ and $R_2$ each stand for an alkyl, cycloalkyl, aryl or aralkyl group, as a stabilizing agent.

It has been described that red phosphorus in moist atmosphere undergoes a chemical surface reaction involving oxidation and disproportionation with the resultant formation of various acids of phosphorous (oxidation stages $+1$ to $+5$) and hydrogen phosphide.

As described by Gmelin, Handbuch der anorganischen Chemie, 8th edition (1964), vol. phosphorus, part B, page 83, Verlag Chemie, Weinheim (Bergstrasse), red phosphorus can be stabilized by means of aluminum hydroxide which is precipitated on the phosphorus particles by the consecutive addition of aqueous 10% sodium hydrogen carbonate and aluminum sulfate solutions heated to 55°–60° C. The resulting aqueous suspension is filtered and the filter residue is dried. This process is, however, not satisfactory in respect of the following points. In order to produce a satisfatory stabilizing effect, it is necessary to use relatively large quantities of aluminum hydroxide which are undesirable inasmuch as they contaminate the phosphorus to an unacceptable extent and adversely affect is further widespread uses.

A further process for stabilizing red phosphorus has been described in U.S. Patent Specification 2,359,243, wherein red phosphorus is suspended in an aqueous 0.04 normal solution of sodium aluminate. Next, a stream of air is passed for 10 hours at 85° to 90° C. through the suspension, which is filtered, washed with hot water and dried under vacuum.

A still further process for stabilizing red phosphorus has been disclosed in U.S. Pat. No. 2,635,953, wherein aluminum hydroxide is used in combination with zinc or magnesium hydroxide.

The processes last described do equally not permit red phosphorus to be satisfactorily stabilized against oxidation with the use of a minimum of stabilizer.

The known oxidation stabilizers have more specifically an insufficient thermal stability and liberate water at higher temperatures, which is disadvantageous. In those cases in which plastics material rendered flame-retardant by means of red phosphorus, which in turn has an oxidation stabilizer incorporated therein, are to be processed on an extruder, it is an imperative requirement that the oxidation stabilizer combine in itself thermal stability with undecomposability and non-liberation of water, even at temperatures higher than 300° C.

In accordance with our present invention, we have unexpectedly found that red phosphorus can satisfactorily be stabilized by precipitating a minor proportion of a metal salt of a phosphinic acid of the general formula

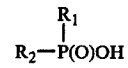

in which $R_1$ and $R_2$ have the meanings given hereinabove.

The present invention relates more particularly to stabilized pulverulent red phosphorus consisting of a homogeneous blend of red phosphorus particles with a size of at most about 2 mm and a metal compound of the second or third group of the Periodic System as an oxidation stabilizer, wherein the metal compound is the aluminum, calcium or zinc salt of a phosphinic acid of the general formula

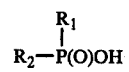

in which $R_1$ and $R_2$ each stand for an alkyl, cycloalkyl, aryl or aralkyl group having 1 to 20 carbon atoms, preferably 1 to 12 carbon atoms, the metal compound being present in the homogeneous blend in a proportion of 0.5 to 5 weight %, preferably 0.5 to 3 weight %.

The radicals $R_1$ and $R_2$ may stand for identical or different, branched and/or unbranched groups which may optionally be substituted, the substituents comprising halogen, such as chlorine or bromine, or a carboxyalkyl-group.

The useful phosphinic acid salts comprise, e.g. the salts of bis-(chloromethyl)-, 2-carboxyethylmethyl- or octylmethyl phosphinic acid.

The red phosphorus is preferably used in the form of particles with a size of about 0.01 to 0.15 mm.

The invention also relates to a process for making stabilized pulverulent red phosphorus consisting of a homogeneous blend of red phosphorus particles with a size of at most 2 mm and a metal compound of the second or third group of the Periodic System as an oxidation stabilizer, which comprises: intimately blending red phosphorus particles with a particle size of at most about 2 mm with about 0.5 to 5 weight %, based on red phosphorus, of a phosphinic acid of the general formula

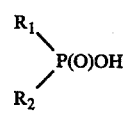

in which $R_1$ and $R_2$ each stand for an alkyl, cycloalkyl, aryl or aralkyl group having 1 to 20 carbon atoms, preferably 1 to 12 carbon atoms, suspending the blend in water and heating the resulting suspension to about 60° to 95° C.; admixing the suspension with at least stoichiometric proportions of an aqueous solution of a water-soluble aluminum, calcium or zinc salt to cause precipitation of the respective salt of phosphinic acid from the aqueous suspension at a pH of 3.0 to 7.5; filtering the resulting mixture, and drying the filter residue at elevated temperature and, if desired, under reduced pressure.

The red phosphorus is more preferably used in the form of particles having a size of about 0.1 to 0.15 mm and its aqueous suspension is preferably heated to a temperature of 80° to 90° C. A further preferred feature of the present process provides for a proportion of 0.5 to 3 weight % of metal compound to be present in the mixture with red phosphorus.

To prepare the phosphinic acid metal salts, use may be made, for example, of $Al_2(SO_4)_3 \cdot 18 H_2O$, $Ca(NO_3)_2 \cdot 4 H_2O$ or $ZnSO_4 \cdot 7 H_2O$, the salts being used in the form of aqueous 5 to 20 weight % solutions. It is good practice to precipitate the phosphinic acid metal salts from the aqueous suspension within a certain pH-range as these metal phosphinates are partially soluble in an acid aqueous medium. The aluminum salts of phosphinic acid should more preferably be precipitated from the aqueous suspension at a pH-value of 3.0 to 3.5, and the calcium or zinc salts of phosphinic acid should be precipitated at a pH-value of 7 to 8 or 5 to 6.

A further preferred feature of the present process finally provides for the filter residue obtained after filtration of the aqueous suspension to be dried at a temperature of 80 to 130° C.

The stabilized red phosphorus and the process of the present invention for making such phosphorus compare favorably with the prior art products and methods inasmuch as the stabilizer is a thermally stable compound which is the first to permit the incorporation of stabilized red phosphorus into plastics at processing temperatures higher than 250° C.

The following Examples illustrate the invention.

EXAMPLE 1

140 ml of an aqueous phosphorus suspension, which contained 100 g of red phosphorus was diluted with 360 ml of water. A pH of 3 was adjusted by means of a 5% sulfuric acid, 5 g of bis-(chloromethyl)-phosphinic acid was added, and the whole was heated to 90° C. with agitation. Next, a solution of 10 g of $Al_2(SO_4)_3 \cdot 18 H_2O$ in 100 ml of water was stirred into the aqueous suspension and a pH of 3.5 was adjusted by means of a 4% sodium hydroxide solution. After a post-reaction period of 30 minutes, the aqueous suspension was filtered, the filter residue was washed with water and dried at 80° C. in a stream of nitrogen.

The red phosphorus so treated was tested for its stability to oxidation. To this end, a three necked round flask provided with a tubular gas inlet, thermometer, reflux condenser and magnetic stirrer was charged with 450 cc of water and 1 g of the red phosphorus, the mixture was heated to 80° C. and 10 l/h of oxygen was introduced thereinto with agitation. A gas mixture consisting of oxygen and hydrogen phosphide (the latter, which was obtained together with acids of phosphorus of various oxidation stages, was formed by disproportionation of red phosphorus) left the reflux condenser. It was delivered to two series-connected wash bottles, which each contained 100 ml of a 5 weight % aqueous mercury(II) chloride solution. The hydrogen phosphide underwent reaction with the mercury(II) chloride in accordance with the following equation:

$$PH_3 + 3 HgCl_2 \rightarrow P(HgCl)_3 + 3 HCl$$

The quantity of oxo acids of phosphorus present in the aqueous suspension of red phosphorus and the quantity of hydrochloric acid present in the gas washing bottles were determined as an index of the stability to oxidation of red phosphorus.

The content of phosphoric acids and the content of hydrochloric acid were determined by titration. The results obtained are indicated in the Table hereinafter.

EXAMPLE 2

The procedure was as in Example 1 but 5 g of 2-carboxyethyl-methyl-phosphinic acid, which replaced the bis-(chloromethyl)-phosphinic acid, was stirred into aqueous suspension. The data determined for the stability to oxidation of the red phosphorus so treated are indicated in the Table hereinafter.

EXAMPLE 3

The procedure was as in Example 1 but 5 g of octyl-methyl-phosphinic acid, which replaced the bis-(chloromethyl)-phosphinic acid, was stirred into the aqueous suspension. The data determined for the stability to oxidation of the red phosphorus so treated are indicated in the Table hereinafter.

EXAMPLE 4

The procedure was as in Example 1 but a solution of 10 g $ZnSO_4 \cdot 7 H_2O$ in 100 ml of water, which replaced the aluminum sulfate solution, was dropped into the aqueous suspension and a pH of 5.5 was established by means of a 5% sodium hydroxide solution.

The data determined for the stability to oxidation of the red phosphorus so treated are indicated in the Table hereinafter.

EXAMPLE 5

The procedure was as in Example 1, but 5 g of octyl-methyl-phosphinic acid was substituted for bis-(chloromethyl)-phosphinic acid, and a solution of 10 g of $ZnSO_4 \cdot 7 H_2O$ in 100 ml of water was substituted for the aluminum sulfate solution, and a pH of 5.5 was established by means of a 5% sodium hydroxide solution.

The data determined for the stability to oxidation of the red phosphorus so treated are indicated in the Table hereinafter.

EXAMPLE 6

The procedure was as in Example 1, but 5 g of octyl-methyl-phosphinic acid was substituted for the bis-(chloromethyl)-phosphinic acid, and a solution of 10 g of $Ca(NO_3)_2 \cdot 4 H_2O$ in 100 ml of water was substituted for the aluminum sulfate solution, and a pH of 7.5 was adjusted by means of a 5% sodium hydroxide solution.

The data determined for the stability to oxidation of the red phosphorus to treated are indicated in the Table hereinafter.

EXAMPLE 7 (Comparative Example)

The procedure was as in Example 1, but the phosphorus was left free from phosphinic acid and aluminum sulfate solution.

The data determined for the stability to oxidation of the red phosphorus are indicated in the following Table.

TABLE

| Example | A | B |
|---------|------|-----|
| 1 | 0.20 | 3.7 |
| 2 | 0.18 | 4.7 |
| 3 | 0.23 | 3.5 |
| 4 | 0.47 | 7.2 |
| 5 | 0.39 | 6.3 |
| 6 | 0.37 | 5.5 |
| 7 | 0.52 | 7.0 |

The figures in column A of the above Table indicate the quantity of hydrogen phosphide (mg $PH_3/g \cdot h$) which is evolved on subjecting the phosphorus specimens to oxidation.

The figures in column B of the above Table relate to the acidity of the aqueous phosphorus-containing suspensions, which is caused by the formation of phosphoric acids on subjecting red phosphorus to oxidation (mg $KOH/g \cdot h$).

As it would appear from the figures in columns A and B, the phosphinic acid compounds of the present invention are capable of stabilizing red phosphorus considerably.

We claim:

1. Stabilized pulverulent red phosphorus comprising a homogeneous blend of red phosphorus particles with a particle size of at most about 2 mm and a metal compound as an oxidation stabilizer, wherein the metal compound is the aluminum, calcium or zinc salt of a phosphinic acid of the general formula

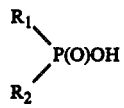

in which $R_1$ and $R_2$ each stand for an alkyl, cycloalkyl, aryl or aralkyl group having 1 to 20 carbon atoms, the metal compound being present in the homogeneous blend in a proportion of about 0.5 to 5 weight %, wherein the phosphinic acid salt is formed by precipitating a phosphinic acid in the presence of the red phosphorus.

2. Red phosphorus as claimed in claim 1, wherein the alkyl, cycloalkyl, aryl or aralkyl group contains 1 to 12 carbon atoms.

3. Red phosphorus as claimed in claim 1, wherein the particles have a size of about 0.01 to 0.15 mm.

4. Red phosphorus as claimed in claim 1, wherein the metal compound is the aluminum, calcium or zinc salt of bis-(chloromethyl)-, 2-carboxyethylmethyl or octylmethylphosphinic acid.

5. Red phosphorus as claimed in claim 1, wherein the homogeneous blend contains the metal compound in a proportion of 0.5 to 3 weight %.

6. In the process for making stabilized pulverulent red phosphorus consisting of a homogeneous blend of red phosphorus particles with a particle size of at most about 2 mm and a metal compound as an oxidation stabilizer, the improvement which comprises: intimately blending red phosphorus particles with a size of at most about 2 mm with about 0.5 to 5 weight %, based on red phosphorus, of a phosphinic acid of the general formula

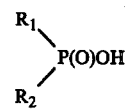

in which $R_1$ and $R_2$ each stand for an alkyl, cycloalkyl, aryl or aralkyl group having from 1 to 20 carbon atoms; suspending the blend in water and heating the resulting suspension to about 60 to 95° C.; admixing the suspension with at least stoichiometric proportions of an aqueous solution of a water-soluble aluminum, calcium or zinc salt to cause precipitation of the respective phosphinic acid salt from the aqueous suspension at a pH of 3.0 to 7.5; filtering the resulting mixture, and drying the filter residue at elevated temperature.

7. The process as claimed in claim 6, wherein the alkyl-, cycloalkyl-, aryl- or aralkyl-phosphinic acid has 4 to 12 carbon atoms.

8. The process as claimed in claim 6, wherein the red phosphorus particles have a size of about 0.01 to 0.15 mm.

9. The process as claimed in claim 6, wherein the aqueous suspension of red phosphorus has a temperature of 80° to 90° C.

10. The process as claimed in claim 6, wherein the aqueous suspension of red phosphorus contains bis-(chloromethyl)-, 2-carboxyethylmethyl or octylmethylphosphinic acid.

11. The process as claimed in claim 6, wherein the red phosphorus is blended with 0.5 to 3 weight % of the phosphinic acid metal salt.

12. The process as claimed in claim 6, wherein the water-soluble salt is $Al_2(SO_4)_3 \cdot 18\ H_2O$, $Ca(NO_3)_2 \cdot 4\ H_2O$ or $ZnSO_4 \cdot 7\ H_2O$.

13. The process as claimed in claim 6, wherein the water-soluble aluminium, calcium or zinc salt is used in the form of a 5 to 20 weight % aqueous solution.

14. The process as claimed in claim 6, wherein the aluminum salt of the respective phosphinic acid is precipitated from the aqueous suspension at a pH-value of 3.0 to 3.5.

15. The process as claimed in claim 6, wherein the calcium or zinc salt of the respective phosphinic acid is precipitated from the aqueous suspension at a pH-value of 7 to 8 or 5 to 6.

16. The process as claimed in claim 6, wherein the filter residue is dried at a temperature of 80° to 130° C.